United States Patent [19]

Rösch et al.

[11] Patent Number: 6,096,845
[45] Date of Patent: *Aug. 1, 2000

[54] PREPARATION OF CRYSTALLINE POLYMERS BY DISPERSION POLYMERIZATION IN THE PRESENCE OF METALLOCENE CATALYST SYSTEMS

[75] Inventors: Joachim Rösch, Ludwigshafen; Josef Wünsch, Schifferstadt, both of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/866,162

[22] Filed: May 30, 1997

[30] Foreign Application Priority Data

May 31, 1996 [DE] Germany ............................ 196 21 969

[51] Int. Cl.⁷ .................................. C08F 4/44; C08F 2/00
[52] U.S. Cl. .......................... 526/160; 526/201; 526/903; 526/943; 526/351
[58] Field of Search ...................... 526/160, 201

[56] References Cited

U.S. PATENT DOCUMENTS

| | | |
|---|---|---|
| 4,098,980 | 7/1978 | Markle et al. ............................ 526/201 |
| 4,357,449 | 11/1982 | Yi ............................................. 526/201 |
| 4,794,096 | 12/1988 | Ewen . |
| 5,371,260 | 12/1994 | Sangokoya . |
| 5,391,793 | 2/1995 | Marks et al. . |
| 5,688,734 | 11/1997 | Speca et al. ............................. 526/129 |
| 5,756,607 | 5/1998 | Lux et al. ................................ 526/127 |
| 5,780,565 | 7/1998 | Clough et al. .......................... 526/206 |
| 5,891,947 | 4/1999 | Hall et al. ............................... 524/457 |

FOREIGN PATENT DOCUMENTS

| | | |
|---|---|---|
| 284 708 | 10/1988 | European Pat. Off. . |
| 295 026 | 12/1988 | European Pat. Off. . |
| 563917 | 10/1993 | European Pat. Off. . |
| 621 279 | 10/1994 | European Pat. Off. . |
| 633272 | 1/1995 | European Pat. Off. . |
| 663 264 | 1/1995 | European Pat. Off. . |
| 700935 | 8/1995 | European Pat. Off. . |
| 4344672 | 6/1995 | Germany . |
| 195 42 356 | 11/1995 | Germany . |
| 91/09882 | 7/1991 | WIPO . |

OTHER PUBLICATIONS

H.F. Herrmann + L.L. Boehm, Poly. Com., 1991, vol. 32, pp. 58–61.
J. Avnir et al., Colloid Interphase Sci., 1985, v. 103, No. 1, 112.
J. Wiesenfeldt et al., ansa—Metallocene derivatives, J. of Organometallic Chem. v. 369, 1989, pp. 359–370.
M. Antberg et al., Makromol. chem. Macromol. Symp., 48/49, 1991, pp. 333–347.

*Primary Examiner*—David W. Wu
*Assistant Examiner*—Roberto Rabago
*Attorney, Agent, or Firm*—Keil & Weinkauf

[57] ABSTRACT

Crystalline polymers of ethylene, propylene or cyclic olefins or mixtures thereof are prepared by a process in which polymerization is carried out in the presence of a metallocene catalyst system in a dispersion.

6 Claims, 1 Drawing Sheet

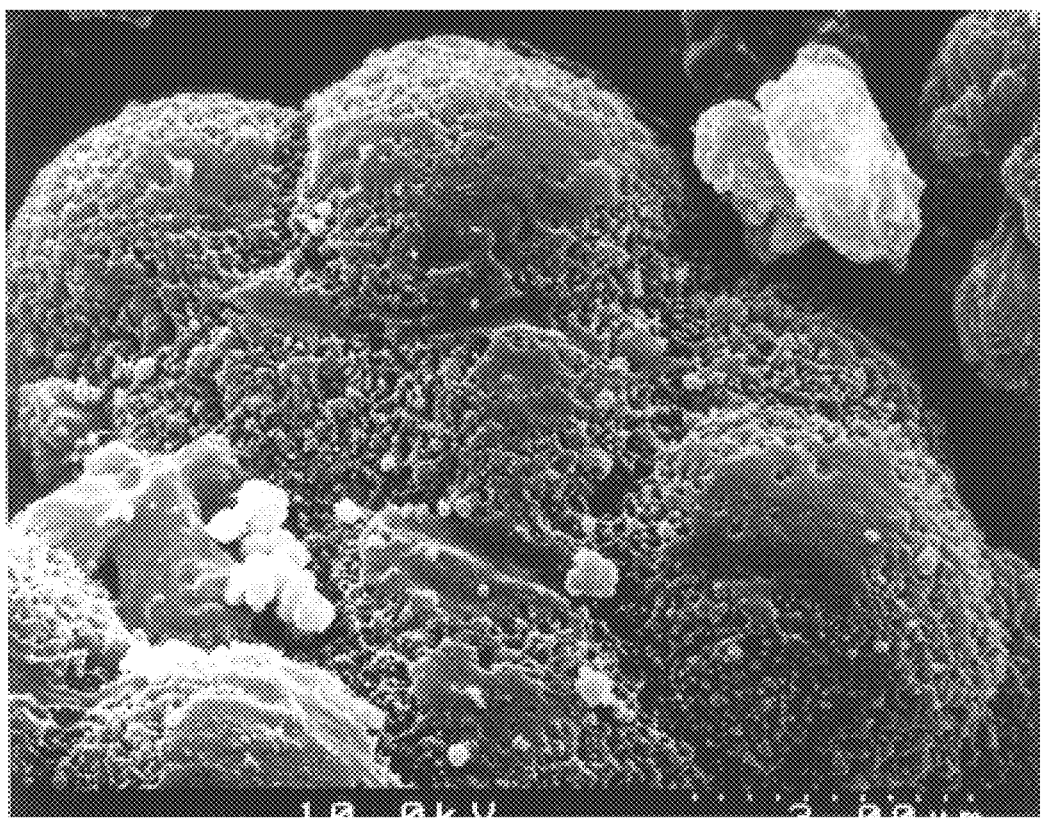

PREPARATION OF CRYSTALLINE POLYMERS BY DISPERSION POLYMERIZATION IN THE PRESENCE OF METALLOCENE CATALYST SYSTEMS

The present invention relates to processes for the preparation of crystalline polymers of ethylene, propylene or cyclic olefins or mixtures thereof.

The present invention furthermore relates to the use of the resulting polymers for the preparation of functionalized compounds.

Owing to their property profile, polyolefin particles which have high porosity can be used in many areas, for example as adsorbents, or catalyst carriers, or for the preparation of functionalized compounds and of polymer blends by filling the pores with further monomers and carrying out polymerization in the pores.

H. F. Herrmann and L. L. Böhm, Polymer Communications, 32 (1991), 58–61, disclose a process for the preparation of polyethylene particles by suspension polymerization in the presence of metallocene catalyst systems. However, this gives only powders which have a low bulk density, are difficult to handle and may lead to dust explosions.

M. Antberg et al., Makromol. Chem., Macromol. Symp.48/49, 1991), 333–347, disclose a process for the preparation of polypropylene particles by suspension polymerization in the presence of metallocene catalyst systems. By means of a special temperature program, polypropylene particles having a higher bulk density can be obtained. However, these particles no longer have any porosity at all.

It is an object of the present invention to provide a process for the preparation of polyolefin particles which have high porosity, are easy to handle and dust-free and have a narrow molecular weight distribution. Furthermore, the process should be technically simple to carry out.

We have found that this object is achieved by processes for the preparation of crystalline polymers of ethylene, propylene or cyclic olefins or mixtures thereof, wherein polymerization is carried out in a dispersion in the presence of a metallocene catalyst system.

We have also found the use of the resulting polymers for the preparation of functionalized compounds.

The monomers used in the novel process are ethylene, propylene or cyclic olefins, preferably of 5 to 12 carbon atoms, such as cyclopentene, cyclohexene, norbornene or mixtures thereof. If two or more monomers are used, mixtures of ethylene and cyclopentene and of ethylene and norbornene are particularly suitable. However, ethylene or propylene are preferably used as the monomer, so that homopolyethylenes or homopolypropylenes are prepared.

Preferred metallocene catalyst systems are those which contain, as active components, A) metallocene complexes of the general formula I

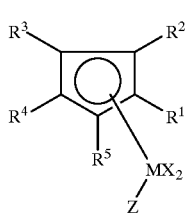

where:

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^6$ or —$NR^6R^7$, $R^6$ and $R^7$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^1$ to $R^5$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, and two adjacent radicals together may furthermore form a saturated or unsaturated cyclic group of 4 to 15 carbon atoms, or $Si(R^8)_3$, $R^8$ is $C_1$–$C_{10}$-alkyl, $C_3$–$C_{10}$-cycloalkyl or $C_6$–$C_{15}$-aryl, is X or 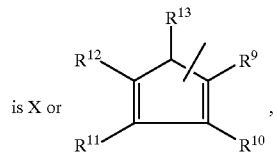

$R^9$ to $R^{13}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, and two adjacent radicals together may furthermore form a saturated or unsaturated cyclic group of 4 to 15 carbon atoms, or $Si(R^{14})_3$, $R^{14}$ is $C_1$–$C_{10}$-alkyl, $C_6$–$C_{15}$-aryl or $C_3$–$C_{10}$-cycloalkyl, or $R^4$ and Z together form a group —$R^{15}$—A—,

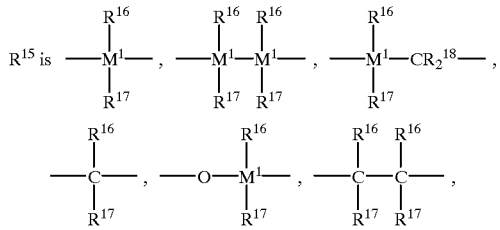

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, $R^{16}$, $R^{17}$ and $R^{18}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two adjacent radicals together with the atoms linking them in each case form a ring, $M^1$ is silicon, germanium or tin,

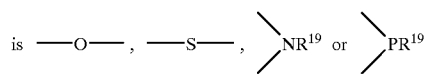

$R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl, or $R^4$ and $R^8$ together form a group —$R^{15}$—, and B) a compound forming metallocenium ions.

Preferred metallocenium complexes of the general formula I are

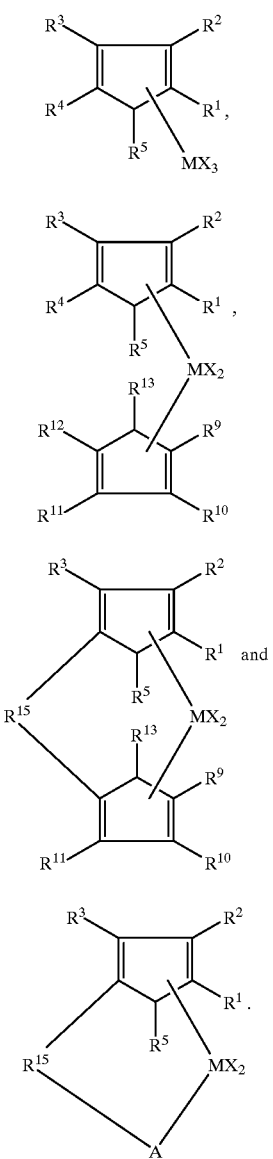

Ia

Ib

Ic

Id

The radicals X can be identical or different but are preferably identical.

Particularly preferred compounds of the formula Ia are those in which

M is titanium, zirconium or hafnium,

X is chlorine, $C_1-C_4$-alkyl or phenyl and $R^1$ to $R^5$ are each hydrogen or $C_1-C_4$-alkyl.

Preferred compounds of the formula Ib are those in which

M is titanium, zirconium or hafnium, x is chlorine, $C_1-C_4$-alkyl or phenyl, $R^1$ to $R^5$ are each hydrogen, $C_1-C_4$-alkyl or $Si(R^8)_3$, $R^9$ to $R^{13}$ are each hydrogen, $C_1-C_4$-alkyl or $Si(R^{14})_3$.

Particularly suitable compounds of the formula Ib are those in which the cyclopentadienyl radicals are identical.

Examples of particularly suitable compounds include:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and the corresponding dimethylzirconium compounds.

Particularly suitable compounds of the formula Ic are those in which $R^1$ and $R^9$ are identical and are each hydrogen or $C_1-C_{10}$-alkyl, $R^5$ and $R^{13}$ are identical and are each hydrogen, methyl, ethyl, isopropyl or tert-butyl, $R^3$ and $R^{11}$ are each $C_1-C_4$-alkyl, $R^2$ and $R^{10}$ are each hydrogen or two adjacent radicals $R^2$ and $R^3$ on the one hand and $R^{10}$ and $R^{11}$ on the other hand together form a cyclic group of 4 to 12 carbon atoms,

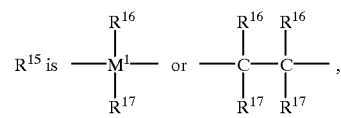

M is titanium, zirconium or hafnium and

X is chlorine, $C_1-C_4$-alkyl or phenyl.

Examples of particularly suitable complex compounds include
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride,
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and dimethylsilanediylbis(2-methylindenyl)-hafnium dichloride and the corresponding dimethylzirconium compounds.

Particularly suitable compounds of the general formula Id are those in which

M is titanium or zirconium,

X is chlorine, $C_1$–$C_4$-alkyl or phenyl,

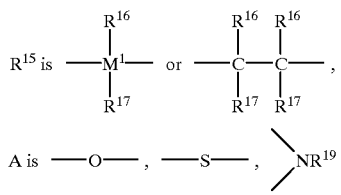

and $R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in Journal of organometallic Chemistry, 369 (1989), 359–370.

Mixtures of different metallocene complexes may also be used.

The catalyst system used in the novel process contains, as component B), a compound forming metallocene ions.

Suitable compounds forming metallocenium ions are strong, neutral Lewis acids, ionic compounds having Lewis acid cations and ionic compounds having Brönsted acids as cations.

Preferred, strong, neutral Lewis acids are compounds of the general formula IV $$M^2X^1X^2X^3 \qquad \text{IV}$$

where $M^2$ is an element of main group III of the Periodic Table, in particular B, Al or Ga, preferably B, and $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred are compounds of the general formula IV, where $X^1$, $X^2$ and $X^3$ are identical, preferably tris(pentafluorophenyl)borane.

Suitable ionic compounds having Lewis acid cations are compounds of the general formula V $$[(Y^{a+})Q_1Q_2 \ldots Q_z]^{d+} \qquad \text{V}$$

where

Y is an element of main groups I to VI or of subgroups I to VIII of the Periodic Table, $Q_1$ to $Q_z$ are each a radical having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl- or mercaptyl, a is an integer from 1 to 6, z is an integer from 0 to 5, d corresponds to the difference a-z, but d is greater than or equal to 1.

Carbonium cations, oxonium cations and sulfonium cations and cationic transition metal complexes are particularly suitable. Particular examples are the triphenylmethyl cation, the silver cation and the 1,1'-dimethylferrocenyl cation. They preferably have noncoordinating opposite ions, in particular boron compounds, as also mentioned in WO 91/09882, preferably tetrakis(pentafluorophenyl)borate.

Ionic compounds having Brönsted acids as cations and preferably likewise noncoordinating opposite ions are mentioned in WO 91/09882, a preferred cation being N,N-dimethylanilinium.

The amount of compounds forming metallocenium ions is preferably from 0.1 to 10 equivalents, based on the metallocene complex IV.

Particularly suitable compounds B) forming metallocium ions are open-chain or cyclic alumoxane compounds of the general formula II or III

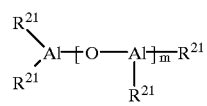

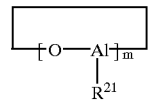

where $R^{21}$ is $C_1$–$C_4$-alkyl, preferably methyl or ethyl, and m is an integer from 5 to 30, preferably from 10 to 25.

The preparation of these oligomeric alumoxane compounds is usually carried out by reacting a solution of a trialkylaluminum with water and is described, inter alia, in EP-A 284 708 and U.S. Pat. No. 4,794,096.

As a rule, the oligomeric alumoxane compounds obtained thereby are in the form of mixtures of both linear and cyclic chain molecules of different lengths, so that m is to be regarded as an average value. The alumoxane compounds may also be present as a mixture with other metal alkyls, preferably with alkylaluminums.

Preferably, both the metallocene complexes (component A) and the compounds forming metallocenium ions (component B) are used in solution, aromatic hydrocarbons of 6 to 20 carbon atoms, in particular xylenes and toluene, being particularly preferred.

Aryloxyalumoxanes, as described in U.S. Pat. No. 5,391,793, aminoalumoxanes, as described in U.S. Pat. No. 5,371,260, aminoalumoxane hydrochlorides, as described in EP-A 633 264, silyloxyalumoxanes, as described in EP-A 621 279, or mixtures thereof may be used as component B).

It has proved advantageous to use the metallocene complexes and the oligomeric alumoxane compound in amounts such that the atomic ratio of aluminum from the oligomeric alumoxane compound to the transition metal from the metallocene complexes is from 10:1 to 106:1, in particular from 10:1 to $10^4$:1.

The novel process is carried out as a dispersion polymerization. Examples of suitable dispersants are styrene/diene two-block copolymers and styrene/diene/styrene three-block copolymers;, and aliphatic hydrocarbons are preferred as the dispersing medium.

The dispersant is preferably used in an amount of from 0.5 to 5% by weight, based on the amount of monomers used. It is advantageously dissolved in an aromatic hydrocarbon, such as toluene or ethylbenzene.

Suitable two-block copolymers may consist of a polymer block comprising styrene and a polymer block comprising butadiene, preferably 1,4-polybutadiene. The sum of the % by weight of the blocks of styrene and of butadiene is 100, and the composition may vary. The styrene block may account for from 10 to 90, preferably from 20 to 80, % by weight, and accordingly the butadiene block for from 90 to 10, preferably from 80 to 20, % by weight. Styrene/butadiene two-block copolymer which may be hydrogenated are also suitable.

Examples of suitable styrene/diene/styrene three-block copolymers are those in which the diene block consists of polybutadiene or polyisoprene and in which the diene block may be hydrogenated or unhydrogenated.

Two-block and three-block copolymers and processes for their preparation are known per se and are described, for example, in Thermoplastic Elastomers (1987), N. R. Legge et al (ed.). Suitable copolymers are also commercially available, for example Kraton® (from Shell).

Particularly suitable aliphatic hydrocarbons which may be used as the dispersing medium are those of 4 to 10 carbon atoms, for example butane, pentane, hexane and heptane, or hydrocarbon mixtures.

In the novel process, it is preferable initially to take the dispersing medium and, if required, the solvent for the dispersant and then to add the dispersant. The metallocene catalyst system, preferably in toluene, is then added. The monomers are then passed in. After the end of the reaction, the resulting crystalline polymer is isolated, preferably mechanically, for example by filtration, and dried. The filtrate contains the active metallocene complex and can be used for further polymerizations.

The polymerization is preferably carried out at from −50 to 180° C., in particular from 0 to 150° C., and from 0.5 to 100, in particular from 1 to 50, bar. The polymerization times are preferably from 0.1 to 24, in particular from 0.2 to 10, hours.

The novel process can be carried out in a technically simple manner and up to high solids contents (up to 50%) without the reactor becoming blocked. The crystalline polymers prepared by the novel process have a high porosity and remain dispersed in the reactor during the polymerization without forming lumps, but, in solid form, are easy to handle and are dust-free. Furthermore, they have a narrow molecular weight distribution.

The crystalline polymers prepared by the novel process have BET surface areas of from 0.5 to 50, preferably from 1 to 20, $m^2/g$ and are suitable for the preparation of functionalized compounds. The BET surface area is determined by measuring the $N_2$-adsorption at low temperatures, as described in J.Colloid Interphase Sci. 103, 1985, 112.

Functional compounds are understood as meaning compounds which have functional groups, such as hydroxyl, amino and in particular epoxy groups.

A preferred process for the preparation of such epoxides can be carried out by a method in which the crystalline polymer prepared by the novel process is reacted with an epoxidizing reagent, such as chloroperbenzoic acid, in suspension. The molar ratio of epoxidizing reagent to polymer is preferably from 20:1 to 1:1, and suitable suspending agents are diethyl ether, tetrahydrofuran and methylene chloride, in particular diethyl ether. The reaction time is preferably from 0.5 to 100 hours, the temperature from 0 to 90° C. and the pressure from 0.5 to 5 bar. The product formed is then isolated.

The preparation of functionalized compounds from the crystalline polymers obtainable by the novel process is technically simple to carry out.

EXAMPLES

Examples 1 and 2

Preparation of Polypropylene (PP)

Example 1:

500 ml of pentane and 20 ml of ethylbenzene were initially taken at room temperature in a 1 l flask having a reflux condenser, and 3.5 g (1% by weight) of commercial hydrogenated styrene/butadiene/styrene three-block copolymer (Kraton® G 1652 from Shell Chemicals, having a styrene content of 29% by weight) were. dissolved therein. 0.2 mmol (82 mg) of ethylidenebisindenylzirconium dichloride, dissolved in 58 ml of a 1.7 molar solution of methylalumoxane in toluene (from Witco), was added to the solution. Propene was then passed in for 4 hours at atmospheric pressure. The temperature of the reaction mixture increased to 36° C. (boiling point of the pentane/ethylbenzene mixture). After the end of the reaction, the polypropylene powder was filtered off by means of a glass frit under inert nitrogen gas and was dried in a drying oven under reduced pressure at 50° C. for 12 hours. The filtrate contained the orange active metallocene complex and could be used for a further polymerization.

320 g of isotactic polypropylene (mp.: 142° C., $M_n$ (gel permeation chromatography at 135° C. in trichlorobenzene) 7800 g/mol, $M_w/M_n$ 1.9).

Particle size (scanning electromicrograph, FIG. 1): 200–600 μm agglomerates formed, said agglomerates being composed of 10–30 μm primary particles. The particles themselves had pores of about 0.1 μm.

The bulk density of the powder was 0.37 kg/l and the BET surface area 5.8 $m^2/g$.

Example 2:

600 ml of pentane were initially taken in a 1 l stirred autoclave and 8.2 g (2% by weight) of a commercial hydrogenated styrene/butadiene/styrene three-block copolymer (Kraton® G 1652 from Shell Chemicals) were dissolved therein. Thereafter, 85 g of propene were introduced and condensed and the mixture was heated to 50° C. The resulting pressure was 6 bar. The polymerization was initiated by adding 0.05 mmol of ethylidenebisindenylzirconium dichloride (21 mg), dissolved in 14.7 ml of 1.7 molar solution of methylalumoxane in toluene (Al:Zr 500:1). As a result of the polymerization, the reaction pressure decreased to 1.5 bar in 90 minutes. The resulting dispersion having a solids content of 20% was discharged via the outlet valve in the base and was then filtered.

Yield: 80 g of isotactic PP

Bulk density: 0.32 g/ml

BET surface area: 3.9 $m^2/g$

Comparative Example V1

The procedure was as in Example 1, but no dispersant was added and pure pentane was used as the dispersing medium.

After a reaction time of 1 h, the experiment had to be terminated since the flask became blocked by precipitated PP powder.

Yield: 85 g of isotactic powder PP

Scanning electromicrograph: The powder consisted only of nonagglomerated primary particles with particle sizes of 10–40 μm.

Density: 0.17 kg/l

Example 3

Epoxidation of Polypropylene 100 g of the porous, isotactic PP from Example 1 were reacted with 1.3 times the molar amount (15.9 g) of m-chloroperbenzoic acid (70%) in suspension in 400 ml of diethyl ether at room temperature. Stirring was carried out for 96 hours at 50° C. The course of the reaction could be monitored in the IR range: the double bond bands at 910 and 3076 cm$^{-1}$ decreased and an epoxide band formed at 3040 cm$^{-1}$. After the end of the reaction, the product was filtered off from the diethyl ether and extracted with methanol until the remaining m-chloroperbenzoic acid had been removed. The remaining methanol was removed at reduced pressure.

Conversion of the double bonds to epoxide (according to epoxide number, DIN 16945): 72%

Comparative Example V2

100 g of a compact, pore-free PP powder, obtained by dissolving the PP from Comparative Example V1 in 1000 ml of p-xylene at 130° C. and then precipitating in methanol (BET surface area: 0.01 m$^2$/g), were epoxidized as in Example 3.

Conversion of the double bonds to epoxide (according to epoxide number): 13%.

We claim:

1. A process for the preparation of crystalline polymers of ethylene, propylene, cyclic olefins or mixtures thereof, which process comprises: polymerizing the monomers in the presence of a metallocene catalyst dispersed in a dispersing medium and wherein a dispersant selected from the group consisting of a styrene diene two-block copolymer and a styrene/diene/styrene three-block copolymer is added to the dispersing medium.

2. A process as defined in claim 1, wherein homopolymers of ethylene or of propylene are prepared.

3. A process as defined in claim 1, wherein the dispersing medium used is an aliphatic hydrocarbon.

4. A process as defined in claim 1, wherein the metallocene catalyst system used is one which contains, as active components, A) metallocene complexes of the formula I

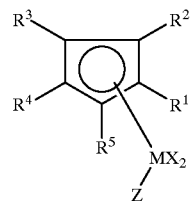

where:
M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —OR$^6$ or —NR$^6$R$^7$, R$^6$ and R$^7$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, R$^1$ to R$^5$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, and two adjacent radicals together may furthermore form a saturated or unsaturated cyclic group of 4 to 15 carbon atoms, or Si(R$^8$)$_3$, R$^8$ is $C_1$–$C_{10}$-alkyl, $C_3$–$C_{10}$-cycloalkyl or $C_6$–$C_{15}$-aryl,

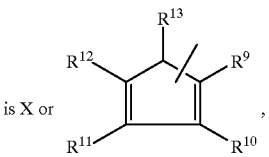

R$^9$ to R$^{13}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, and two adjacent radicals together may furthermore form a saturated or unsaturated cyclic group of 4 to 15 carbon atoms, or Si(R$^{14}$)$_3$, R$^{14}$ is $C_1$–$C_{10}$-alkyl, $C_6$–$C_{15}$-aryl or $C_3$–$C_{10}$-cycloalkyl, or R$^4$ and Z together form a group —R$^{15}$—A—,

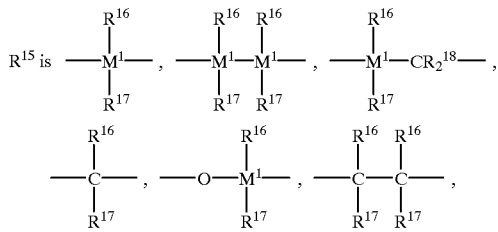

=BR$^{16}$, =AlR$^{16}$, —Ge—, —Sn—, —O—, —S—, =SO, =SO$_2$, =NR$^{16}$, =CO, =PR$^{16}$ or =P(O)R$^{16}$,

R$^{16}$, R$^{17}$ and R$^{18}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two adjacent radicals together with the atoms linking them in each case form a ring, $M^1$ is silicon, germanium or tin, is —O—, —S—, $>$NR$^{19}$ or $>$PR$^{19}$ $R^{19}$ is $C_1$–$C_{10}$-alkyl, $C_6$–$C_{15}$-aryl, $C_3$–$C_{10}$-cycloalkyl, alkylaryl or Si($R^{20}$)$_3$, $R^{20}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl, or $R^4$ and $R^8$ together form a group —$R^{15}$—, and B) a compound forming metallocenium ions.

5. A process as defined in claim 1, wherein an open-chain or cyclic alumoxane compound of the formula II or III

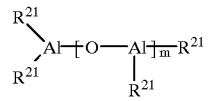  II

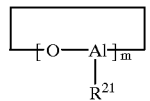  III where $R^{21}$ is $C_1$–$C_4$-alkyl and m is an integer from 5 to 30, is used as the compound B) forming metallocenium ions.

6. A process as defined in claim 1, wherein a dispersant is used whose diene block has been hydrogenated.

* * * * *

UNITED STATES PATENT AND TRADEMARK OFFICE
CERTIFICATE OF CORRECTION

PATENT NO.: 6,096,845

DATED: August 1, 2000

INVENTOR(S): ROESCH et al.

It is certified that error appears in the above-identified patent and that said Letters Patent is hereby corrected as shown below:

Col. 10, claim 4, line 40, insert --Z-- before "is"

Col. 11, claim 4, line 7, insert --A-- before "is".

Signed and Sealed this

Seventeenth Day of April, 2001

Attest:

NICHOLAS P. GODICI

*Attesting Officer*     *Acting Director of the United States Patent and Trademark Office*